(12) United States Patent
Nunokawa et al.

(10) Patent No.: US 6,246,741 B1
(45) Date of Patent: Jun. 12, 2001

(54) FUEL ASSEMBLY

(75) Inventors: Kohichi Nunokawa; Yasuhisa Asano, both of Hygo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/258,443

(22) Filed: Feb. 26, 1999

(30) Foreign Application Priority Data

Jul. 8, 1998 (JP) .................................................. 10-193236

(51) Int. Cl.⁷ ....................................................... G21C 3/30
(52) U.S. Cl. ........................ 376/434; 376/207; 376/225; 376/234; 376/242; 376/327
(58) Field of Search .................................... 376/225, 234, 376/242, 207, 327, 434

(56) References Cited

U.S. PATENT DOCUMENTS

| 3,562,109 | 2/1971 | Bezold et al. | 176/36 |
|---|---|---|---|
| 4,229,256 | 10/1980 | Luetzow | 176/36 |
| 4,655,990 | 4/1987 | Laclercq | 376/225 |
| 5,068,083 | 11/1991 | John, Jr. et al. | 376/449 |
| 5,606,583 | 2/1997 | Verdier | 376/260 |

FOREIGN PATENT DOCUMENTS

| 58-223090 | * | 12/1988 | (JP) . |
|---|---|---|---|
| 8-189981 | * | 7/1996 | (JP) . |
| 10-123274 | * | 5/1998 | (JP) . |
| 11-160475 | * | 6/1999 | (JP) . |

OTHER PUBLICATIONS

The AFA 3G Fuel Assembly; G. Musuy; J.C Peyran—Framtome—Nuclear Fuel, Lyon France; pp. 1–4; Nov. 5, 1997.

* cited by examiner

Primary Examiner—Michael J. Carone
Assistant Examiner—Jack Keith
(74) Attorney, Agent, or Firm—Gottlieb, Rackman & Reisman, P.C.

(57) ABSTRACT

A fuel assembly for a pressurized water reactor having control rod guide thimbles (5) each having a dashpot (12) for protecting against flexural deformation which may impair insertability of a control rod The fuel assembly includes, a plurality of control rod guide thimbles (5) having bottom and top end portions fixedly secured to a lower nozzle (2) and an upper nozzle (4), respectively, disposed in opposition to each other. The dashpot (12) of each control rod guide thimble (5) includes a small diameter section (13b) having an outer diameter smaller than that of the control rod guide thimble (5) formed at an upper portion of the dashpot (12), and a large diameter section (13a) having an outer diameter substantially equal to that of the control rod guide thimble (5) formed at a lower portion of the dashpot (12). With the length of the control rod guide thimble (5) represented by L, the effective length (S) of the small diameter section (13b) is selected to lie within a range of from 0.03 L to 0.1 L.

3 Claims, 5 Drawing Sheets

FUEL ASSEMBLY

BACKGROUND OF THE INVENTION

1. Field of the Invention

The present invention relates to a fuel assembly which is used in a pressurized water reactor.

2. Description of Related Art

A conventional fuel assembly used in a pressurized water reactor, which includes, a lower nozzle disposed on a lower core plate of the pressurized water reactor, an upper nozzle having a hold-down spring for holding down the lower nozzle against the lower core plate, a plurality of control rod guide thimbles for guiding control rods extending through the upper nozzle toward the lower core plate, a plurality of supporting grids mounted on the control rod guide thimbles, and a number of fuel rods held by the supporting grids in parallel with the control rod guide thimbles, is disclosed in a pamphlet published by FRAMATOME Co. entitled "SNE97-La Coruna-Nov. 5–7, 1997".

In a fuel assembly such as mentioned above, when the control rods, detached from the control rod driving unit upon emergency shutdown of the nuclear reactor, fall within the control rod guide thimbles without being decelerated, the upper nozzle of the fuel assembly may be subjected to an excessively large impact force. Consequently, dashpots of a thin-tube configuration are formed within the control rod guide thimbles so that the speed at which the control rods fall within the control rod guide thimbles is decreased to thereby dampen the impact force applied to the upper nozzle.

However, in a conventional fuel assembly such as described above, the dashpot has a length ranging from 0.16 L to 0.18 L, wherein L represents the entire length of a control rod guide thimble. Consequently, flexural deformation may take place in the dashpot under compression loads acting in the axial direction of the control rod guide thimble, giving rise to problems in that insertability of the control rod may be impaired due to the flexural deformation of the dashpot.

SUMMARY OF THE INVENTION

In the light of the state of the art described above, it is an object of the present invention to provide a fuel assembly of a structure such that the dashpot can be positively protected against flexural deformation under the compression loads acting in the axial direction of the control rod guide thimble.

In view of the above and other objects, which will become apparent as the description proceeds, there is provided according to a general aspect of the present invention a fuel assembly for a pressurized water reactor which includes, a lower nozzle disposed on a lower core plate of the pressurized water reactor, an upper nozzle having hold-down spring means for holding down the lower nozzle against the lower core plate, a plurality of control rod guide thimbles for guiding control rods extending through the upper nozzle toward the lower core plate, a plurality of supporting grids mounted on the control rod guide thimbles, a number of fuel rods held by the supporting grids in parallel with the control rod guide thimbles, and dashpots each formed in a thin tubular shape in each of the control rod guide thimbles for reducing thee falling speed of the control rods. Each dashpot is comprised of a large diameter section which has a diameter substantially equal to that of the control rod guide thimble and which is formed at a lower portion of the dashpot and a small diameter section which has a diameter smaller than that of the large diameter section and which is formed at an upper portion of the dashpot, wherein the small diameter section has an effective length selected so as to fall within a range of 0.03 L to 0.1 L where L represents a length of the control rod guide thimble.

In a preferred mode of the present invention, the effective length of the small diameter section may be selected so as to fall within a range of from 0.04 L to 0.06 L In another preferred mode, the length of the dashpot may be dimensioned so as to fall within a range of from 0.16 L to 0.18 L, while the length of the large diameter section may be so selected as to fall within a range of from 0.06 L to 0.15 L and more preferably within a range of from 0.10L to 0.14 L. In yet another preferred mode for carrying out the invention, another small diameter section may be additionally provided in a lower end portion of the large diameter section.

The above and other objects, features and attendant advantages of the present invention will be more easily understood by reading the following description of the preferred embodiments, to be taken only by way of example, in conjunction with the accompanying drawings.

BRIEF DESCRIPTION OF THE DRAWINGS

In the course of the description which follows reference is made to the drawings in which.

DESCRIPTION OF THE PREFERRED EMBODIMENTS

Figure 1:
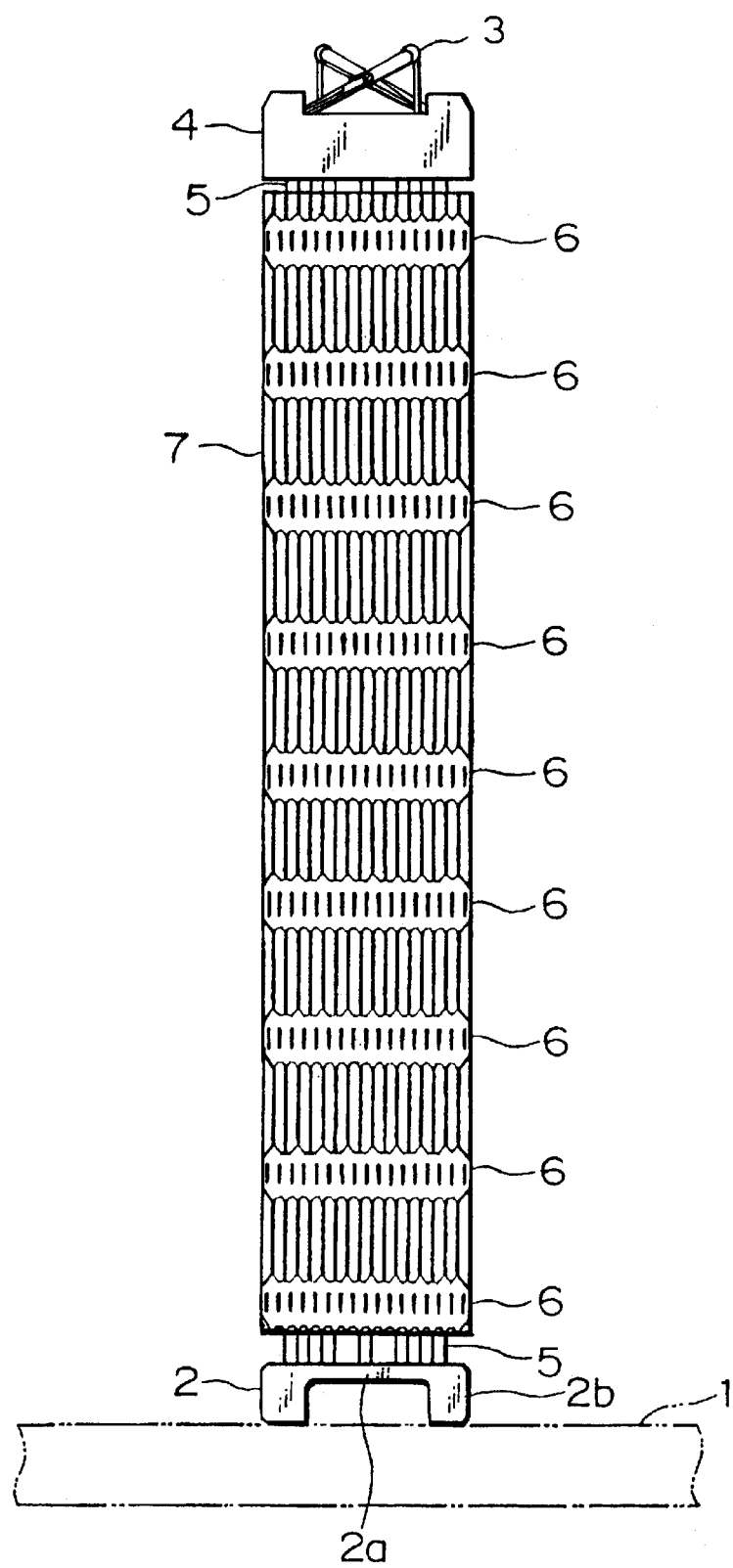
FIG. 1 is a side elevational view showing a fuel assembly according to a first embodiment of the present invention.

The present invention will be described in detail in conjunction with what are presently considered preferred or typical embodiments thereof with reference to the accompanying drawings. In the following description, like reference characters designate like or corresponding parts throughout the several views.

Figure 2:
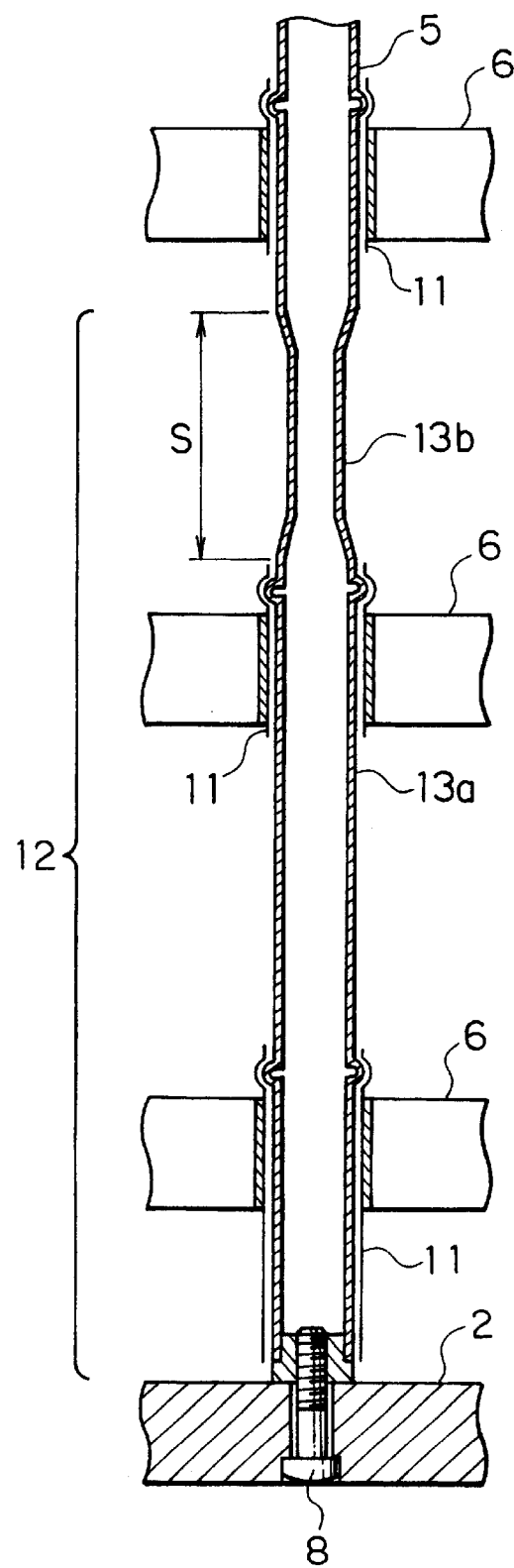
FIG. 2 is a fragmentary vertical sectional view showing an interconnecting structure of a lower nozzle and a control rod guide thimble in the fuel assembly according to the first embodiment of the invention.

Now, description will be made of the fuel assembly according to a first embodiment of the present invention with reference to FIGS. 1 to 3. The fuel assembly according to the embodiment of the invention is comprised of a lower nozzle 2 disposed on a lower core plate 1, an upper nozzle 4 having hold-down springs 3 for pressing and holding down the lower nozzle 2 against the lower core plate 1, a plurality of control rod guide thimbles 5 for guiding control rods extending through the upper nozzle 4 toward the lower core plate 1, a plurality of support grids 6 mounted onto the control rod guide thimbles 5, and a number of fuel rods 7 held in parallel with the control rod guide thimbles 5 by the support grids 6.

The lower nozzle 2 is constituted by a plate portion 2a formed in a square shape, and having four leg portions 2b formed on the bottom surface at four corners thereof respectively. A number of coolant flow holes are opened in the plate portion 2a of the lower nozzle 2. Additionally, a number of thimble mounting holes normally corresponding to the number of the control rod guide thimbles 5 are opened in the plate portion 2a. In each of the thimble mounting holes, a thimble mounting bolt 8 (see FIG. 2) is inserted from the bottom side of the lower nozzle 2. Lower end portions of the control rod guide thimbles 5 are secured onto the top surface of the lower nozzle 2 by means of these thimble mounting bolts 8.

Figure 3:
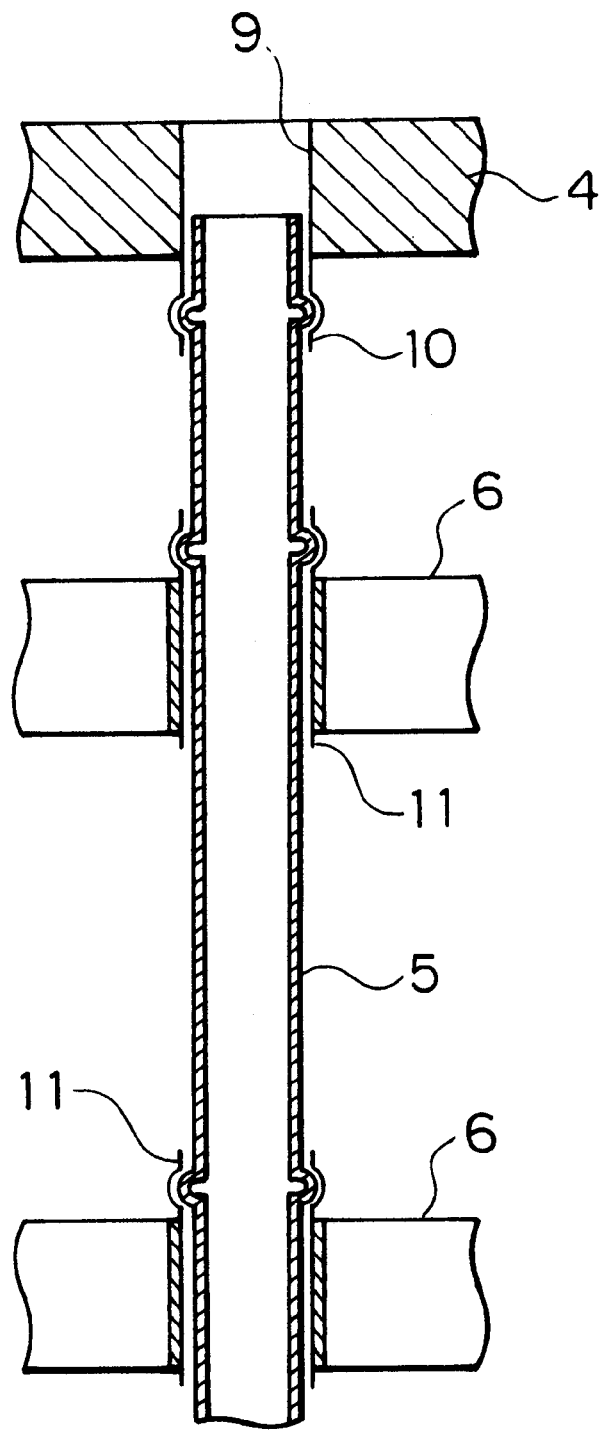
FIG. 3 is a fragmentary vertical sectional view illustrating an interconnecting structure of an upper nozzle and a control rod guide thimble in the fuel assembly according to the first embodiment of the invention.

The upper nozzle 4 is formed as a box-like structure having a central recess formed in a top cover portion thereof, wherein a plurality of control rod receiving through-holes 9 are formed in the upper nozzle 4 (see FIG. 3). These control rod receiving through-holes 9 are provided in correspondence to the control rod guide thimbles 5, respectively, wherein a connecting pipe 10 is welded to each of the control rod receiving through-holes 9 for connecting the top end portion of the control rod guide thimble 5 to the upper nozzle 4. The connecting pipe 10 has an inner diameter slightly greater than the outer diameter of the control rod guide thimble 5. The control rod guide thimble 5 and the connecting pipe 10 are joined together by a bulging process.

Each of the supporting grids 6 comprises a frame with a square shape, and a number of metal plates assembled together inside of the square frame, wherein a plurality of sleeves 11 are secured to the metal plates by welding. The sleeves 11 are provided for mounting each of the supporting grids 6 to the control rod guide thimbles 5, wherein the associated control rod guide thimble 5 and sleeve 11 are joined together by a bulging process.

The control rod guide thimbles 5 are formed in the shape of a straight tube, wherein a lower end portion of each control rod guide thimble 5 is provided with a dashpot 12. The dashpot 12 is designed to dampen an impact force applied to the upper nozzle 4 by reducing the falling speed of the control rod upon detachment thereof from the control rod driving unit. With "L" representing the length of the control rod guide thimble 5, the dashpot 12 has a length ranging from 0.16 L to 0.18 L. Further, a large diameter section 13a is formed at a lower portion of each dashpot 12, while the upper portion of each dashpot 12 is formed as a small diameter section 13b. The outer diameter of the large diameter section 13a is dimensioned to be approximately equal to that of the control rod guide thimble 5. The length of the dashpot 12, exclusive of the large diameter section 13a, i.e., the effective length S of the small diameter section 13b, is so selected as to fall within a range of from 0.03 L to 0.1 L, preferably within a range of from 0.04 L to 0.06 L, wherein "L" represents the entire length of the control rod guide thimble 5. Consequently, the length S' of the large diameter section 13a is dimensioned to be within a range of from 0.06 L to 0.15 L and preferably within a range of from 0.10 L to 0.14 L.

Figure 4:
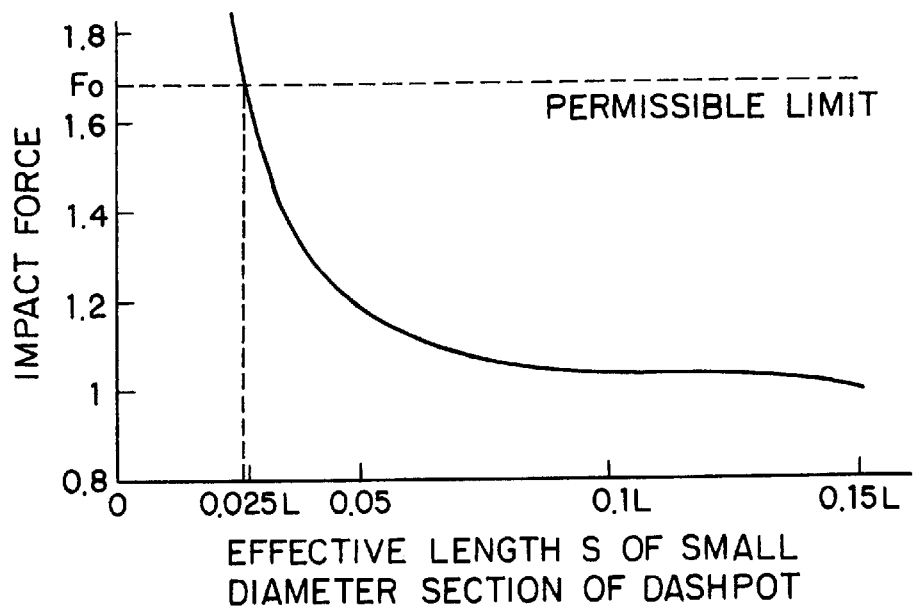
FIG. 4 is a graph illustrating a result of analysis concerning the relationship between an impact force applied to the upper nozzle upon detachment of control rods from a control rod driving unit and the length of the small diameter section of the dashpot.

FIG. 4 is a graph illustrating the results of analysis concerning the relationship between the impact force F applied to the upper nozzle 4 when the control rods are detached from the associated control rod driving unit and the length of the dashpot 12, exclusive of the large diameter section 13a; i.e., the effective length S of the small diameter section 13b. As can be seen from this figure, the effective length S of the small diameter section 13b of the dashpot 12 should preferably be greater than 0.03 L in order to make the impact force F applied to the upper nozzle 4 smaller than the permissible limit value $F_0$.

Figure 5:
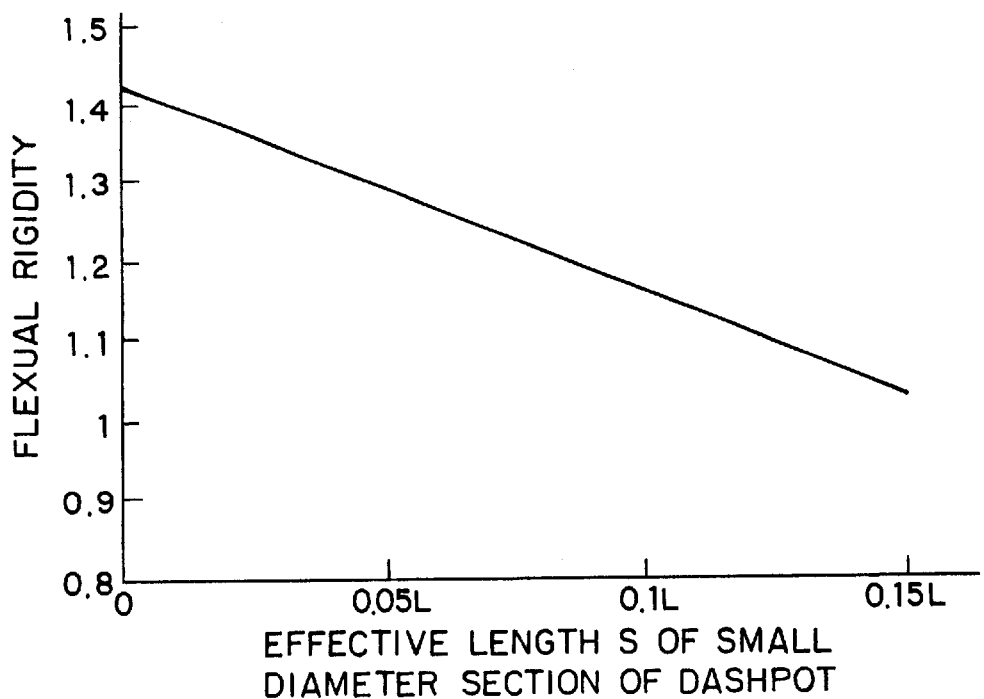
FIG. 5 is a graph illustrating the results of analysis concerning the relationship between the flexural rigidity of a dashpot and the length of a small diameter section of the dashpot.

Next, FIG. 5 is a graph illustrating the results of analysis concerning the relationship between the flexural rigidity of the dashpot 12 and the effective length S of the small diameter section 13b of the dashpot. As can be seen from this figure, when the effective length S of the small diameter section 13b of the dashpot is selected to be equal to 0.1 L, the flexural rigidity of the dashpot 12 increases by about 15% compared to the conventional dashpot employed in the fuel assembly known heretofore. Further, when the effective length S of the small diameter section 13b of the dashpot is selected to be S=0.05 L, the flexural rigidity of the dashpot 12 increases by about 30% compared to the conventional dashpot.

Thus, it can be understood from the foregoing description that when the effective length S of the small diameter section 13b of the dashpot 12, exclusive of the large diameter section 13a, is selected so as to fall within the range of 0.03 L to 0.1 L and preferably within a range of 0.04 L to 0.06 L, the impact force F applied to the upper nozzle 4 upon detachment of the control rods can be suppressed to be smaller than the permissible limit value $F_0$, and the flexural rigidity of the dashpot 12 can be increased as well. Thus, the dashpot 12 can be protected against flexural deformation under a compression load acting in the axial direction of the control rod guide thimble 5.

Furthermore, the present invention is not intended to be limited to the embodiment described above, and numerous modifications maybe conceived.

Figure 6:
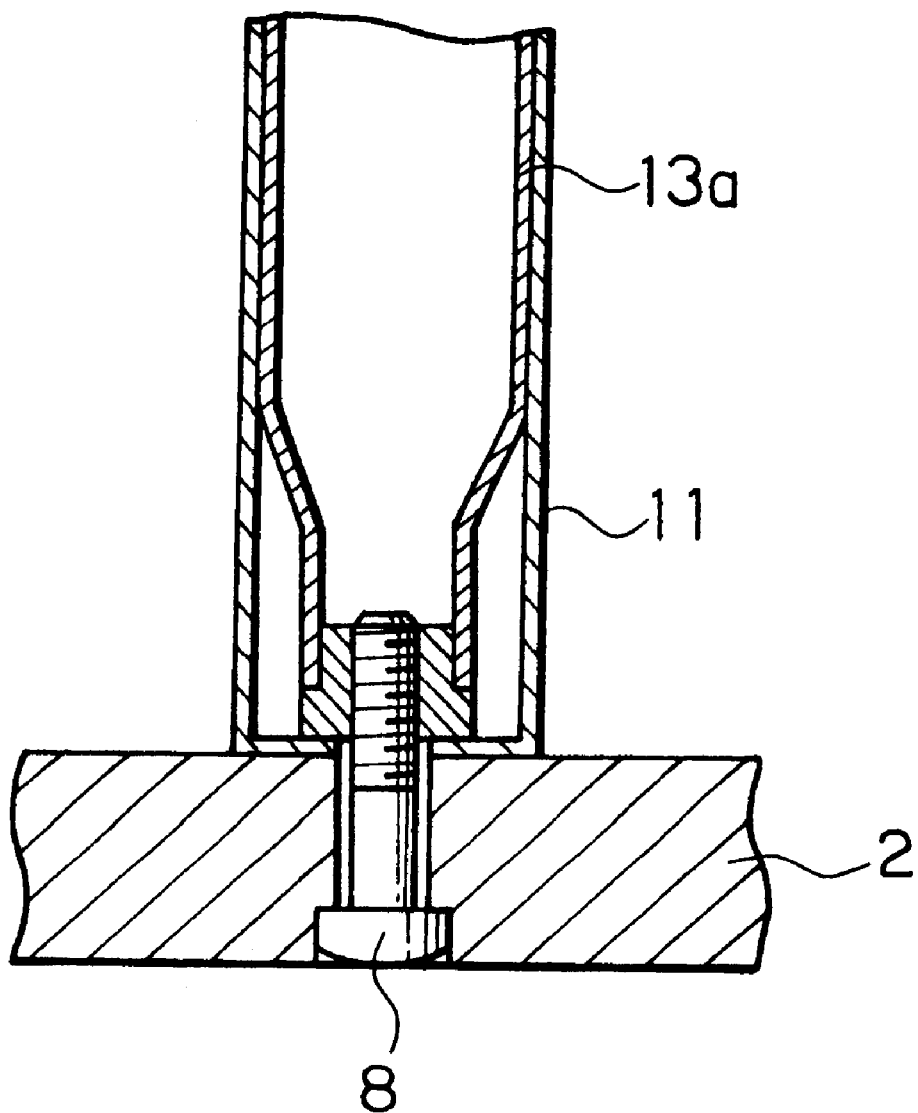
FIG. 6 is a fragmentary vertical elevational view showing an essential portion of the fuel assembly according to a second embodiment of the present invention.

By way of example, in the case of the fuel assembly described above, the outer diameter of the lower end portions of the dashpots 12 is formed so as to be approximately equal to that of the control rod guide thimble 5. However, the outer diameter of the lower end portions of the dashpots 12 may be formed smaller than that of the control rod guide thimbles 5 as shown in FIG. 6, which shows the fuel assembly according to a second embodiment of the present invention.

As is apparent from the foregoing description, with the arrangement of the present invention, since large diameter sections having approximately the same diameter as that of the control rod guide thimbles are formed in lower portions of the dashpots and the length of the dashpot, exclusive of the large diameter section, i.e., the length of the small diameter section, is selected so as to lie within a range of 0.03 L to 0.1 L (where L represents the entire length of the control rod guide thimble), a fuel assembly can be realized in which the dashpots of the control rod guide thimbles are protected against flexural deformation which may otherwise occur under the compression loads acting in the axial or longitudinal direction of the control rod guide thimbles.

Many modifications and variations of the present invention are possible in the light of the above techniques. It is therefore to be understood that within the scope of the appended claims, the invention may be practiced other than as specifically described.

What is claimed is:

1. A fuel assembly for a pressurized water reactor, comprising a lower nozzle to be disposed on a lower core plate of said pressurized water reactor;

an upper nozzle having hold-down spring means for holding down said lower nozzle against said lower core plate;

a plurality of control rod guide thimbles for guiding control rods extending through said upper nozzle toward said lower core plate;

a plurality of supporting grids mounted on said control rod guide thimbles;

a number of fuel rods held by said supporting grids in parallel with said control rod guide thimbles;

each of said control rod guide thimbles shaped to form a thin tubular dashpot at a lower portion of said control rod for reducing falling speed of said control rods;

wherein said dashpot includes a large diameter section having a diameter substantially equal to that of said control rod guide thimble formed at a lower portion of said dashpot, and a small diameter section having a diameter smaller than that of said large diameter section formed at an upper portion of said dashpot, and wherein said small diameter section has an effective length dimensioned so as to fall within a range of 0.03 L to 0.1 L, where L represents an entire length of said control rod guide thimble.

2. A fuel assembly according to claim 1, wherein the effective length of said small diameter section ranges from 0.04 L to 0.06 L.

3. A fuel assembly according to claim 1, wherein the length of said dashpot is dimensioned so as to fall within a range of 0.16 L to 0.18 L.

* * * * *